US011010961B2

United States Patent
Stachniak et al.

(10) Patent No.: US 11,010,961 B2
(45) Date of Patent: May 18, 2021

(54) OBJECT PERMANENCE IN SURFACE RECONSTRUCTION

(71) Applicant: Microsoft Technology Licensing, LLC, Redmond, WA (US)

(72) Inventors: Szymon Piotr Stachniak, Seattle, WA (US); Ali Osman Ulusoy, Seattle, WA (US); Hendrik Mark Langerak, Bellevue, WA (US); Michelle Brook, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 16/352,402

(22) Filed: Mar. 13, 2019

(65) Prior Publication Data
US 2020/0226820 A1 Jul. 16, 2020

Related U.S. Application Data

(60) Provisional application No. 62/791,649, filed on Jan. 11, 2019.

(51) Int. Cl.
*G06T 15/20* (2011.01)
*G06T 17/20* (2006.01)
(Continued)

(52) U.S. Cl.
CPC .......... *G06T 15/205* (2013.01); *G06N 20/00* (2019.01); *G06T 17/205* (2013.01); *G06T 19/006* (2013.01); *G06T 19/20* (2013.01)

(58) Field of Classification Search
None
See application file for complete search history.

(56) References Cited

U.S. PATENT DOCUMENTS

2015/0062120 A1 3/2015 Reisner-kollmann et al.
2016/0335486 A1 11/2016 Fleishman et al.
(Continued)

OTHER PUBLICATIONS

"A Spatially Augmented Reality Sketching Interface for Architectural Daylighting Design", by Yu Sheng, Theodore Yapo, Christopher Young, and Barbara Cutler, IEEE Transactions on Visualization and Computer Graphics, vol. 17, No. 1, pp. 38-50, Jan. 2011. (Year: 2011).*

(Continued)

*Primary Examiner* — James A Thompson
(74) *Attorney, Agent, or Firm* — Alleman Hall Creasman & Tuttle LLP

(57) ABSTRACT

A computer system is provided that includes a camera device and a processor configured to receive scene data captured by the camera device for a three-dimensional environment that includes one or more physical objects, generate a geometric representation of the scene data, process the scene data using an artificial intelligence machine learning model that outputs object boundary data and object labels, augment the geometric representation with the object boundary data and the object labels, and identify the one or more physical objects based on the augmented geometric representation of the three-dimensional environment. For each identified physical object, the processor is configured to generate an associated virtual object that is fit to one or more geometric characteristics of that identified physical object. The processor is further configured to track each identified physical object and associated virtual object across successive updates to the scene data.

20 Claims, 9 Drawing Sheets

(51) Int. Cl.
*G06T 19/20*     (2011.01)
*G06T 19/00*     (2011.01)
*G06N 20/00*     (2019.01)

(56) References Cited

U.S. PATENT DOCUMENTS

| | | | | |
|---|---|---|---|---|
| 2017/0206712 | A1* | 7/2017 | Petrovskaya | G06F 1/163 |
| 2017/0228886 | A1* | 8/2017 | Kashibuchi | G06T 19/006 |
| 2017/0337741 | A1* | 11/2017 | Fradet | G06T 11/001 |
| 2019/0304193 | A1* | 10/2019 | Byrd, Jr. | G06T 19/006 |
| 2019/0325661 | A1* | 10/2019 | Baumbach | G06T 15/04 |
| 2019/0378423 | A1* | 12/2019 | Bachrach | G05D 1/0088 |
| 2019/0392643 | A1* | 12/2019 | Busto | G06T 19/006 |
| 2020/0151959 | A1* | 5/2020 | Nissinen | G06F 3/013 |
| 2020/0258315 | A1* | 8/2020 | Li | G02B 27/017 |

OTHER PUBLICATIONS

"Pseudo-Immersive Real-Time Display of 3D Scenes on Mobile Devices", by Ming Li, Arne Schmitz, and Leif Kobbelt, 2011 International Conference on 3D Imaging, Modeling, Processing, Visualization and Transmission, pp. 41-48, 2011. (Year: 2011).*

Moreno, et al., "SLAM++: A Simultaneous Localisation and Mapping at the Level of Objects", In Proceedings of the IEEE Conference on Computer Vision and Pattern Recognition, Jun. 23, 2013, pp. 1352-1359.

"International Search Report and Written Opinion Issued in PCT Application No. PCT/US2020/012102", dated Mar. 30, 2020, 12 Pages.

* cited by examiner

FITTED VIRTUAL OBJECT PRIMITIVE OVERLAID ON SURFACE MESH

APPLYING TRANFORMATION TO VIRTUAL OBJECT PRIMITIVE TO ACCOUNT FOR CHANGE IN USER PERSPECTIVE WITH SURFACE MESH COMPUTED ONLY IN AREAS AROUND THE VIRTUAL OBJECT

OBJECT PERMANENCE IN SURFACE RECONSTRUCTION

CROSS REFERENCE TO RELATED APPLICATIONS

This application claims priority to U.S. Provisional Patent Application Ser. No. 62/791,649, filed Jan. 11, 2019, the entirety of which is hereby incorporated herein by reference for all purposes.

BACKGROUND

Typical surface reconstruction processes that produce and update geometric representations of a physical environment sporadically change between each update. While the structure of the geometric representation may stay consistent, due to camera noise and environmental changes, the vertices and indices of the geometric representation may be significantly different between one surface reconstruction update to another. Developing applications that utilize these sporadically changing geometric representations can be challenging.

SUMMARY

According to one aspect of the present disclosure, a computer system is provided. The computer system may include a camera device and a processor configured to receive scene data captured by the camera device for a three-dimensional environment that includes one or more physical objects, generate a geometric representation of the scene data, process the scene data using an artificial intelligence machine learning model that outputs object boundary data and object labels, augment the geometric representation with the object boundary data and the object labels, and identify the one or more physical objects based on the augmented geometric representation of the three-dimensional environment. For each identified physical object, the processor may be configured to generate an associated virtual object that is fit to one or more geometric characteristics of that identified physical object. The processor may be further configured to track each identified physical object and associated virtual object across successive updates to the scene data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 at (B) shows an example surface mesh generated by the computer system of FIG. 1. FIG. 5 at (C) shows an example surface mesh augmented by signed distance field data generated by the computer system of FIG. 1. FIG. 5 at (D) shows an example extracted set of voxels tagged by a table object label by the computer system of FIG. 1. FIG. 5 at (E) shows a virtual table object primitive being fit to the extracted set of voxels by the computer system of FIG. 1. FIG. 5 at (F) shows the fitted virtual table object primitive of FIG. 5 at (E).

FIG. 6 at (B) shows a transformation to the fitted virtual table object primitive to account for a change in user perspective in a subsequent update to the scene data applied by the computer system of FIG. 1.

DETAILED DESCRIPTION

Augmented and virtual reality head mounted display (HMD) devices typically may compute and maintain continuously updating representations of a physical environment being imaged by camera of the HMD device. For example, these devices may perform a surface reconstruction process that produces and updates a mesh representation of the physical environment. However, while the structure of the mesh representation may stay consistent, due to camera noise and environmental changes, the vertices and indices of the mesh representation may be significantly different between one surface reconstruction update to another.

These differences between each update may be challenging to utilize when developing applications to be run on the HMD device. Typically, in order to process and use the mesh representation of the physical environment, applications freeze the mesh representation as a static mesh or treat the world as a flowing set of triangles and re-compute derivative data for each update. However, these approaches may cause visual artifacts to occur and degrade performance of the application.

Figure 1:
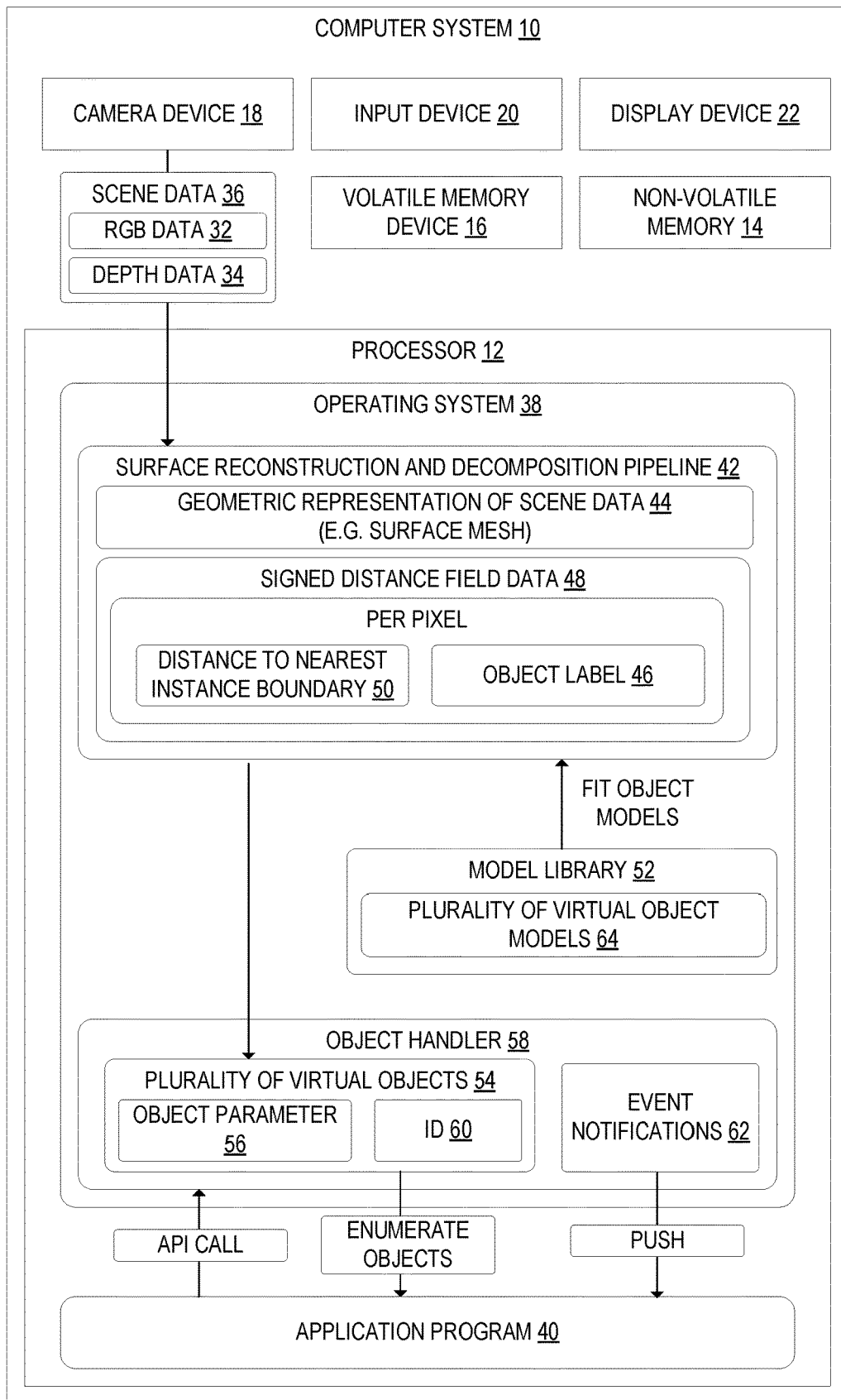
FIG. 1 shows a schematic view of a computer system for decomposing scene data captured for a physical environment into virtual objects that persist over successive updates, according to one embodiment of the present disclosure.

To address these issues, FIG. 1 illustrates a computer system 10 that is configured to perform a surface reconstruction process that decomposes scene data captured for a physical environment into specific objects that persist and are updated over time. These objects may be given unique identifiers and made available to applications executed on the computer system 10. Computer system 10 that may take the form of an HMD device, a desktop computer device, a mobile computer device, or another suitable form. The computer system 10 comprises a processor 12, a non-volatile memory device 14, a volatile memory device 16, a camera device 18, one or more input devices 20, and a display device 22. The camera device 18 may include a red-green-blue (RGB) camera and a depth camera configured to take RGB and depth images of a physical environment in front of the camera device 18. In one example, the camera device 18 may include one or more cameras located in different positions in the physical environment. In an HMD device example, the camera device 18 may take the form of outward facing cameras on the HMD device.

The one or more input devices 20 may include, for example, a keyboard and mouse, a gesture input device (e.g. gestures captured by the camera device 18), accelerometer and inertial sensor devices on an HMD device, etc. In one example, the display device 22 may take the form of a stand-alone display, a display screen of a mobile device, a large format display, etc. In an HMD device example, the display device 22 may take the form of a near-eye display integrated with the HMD device.

Figure 2:
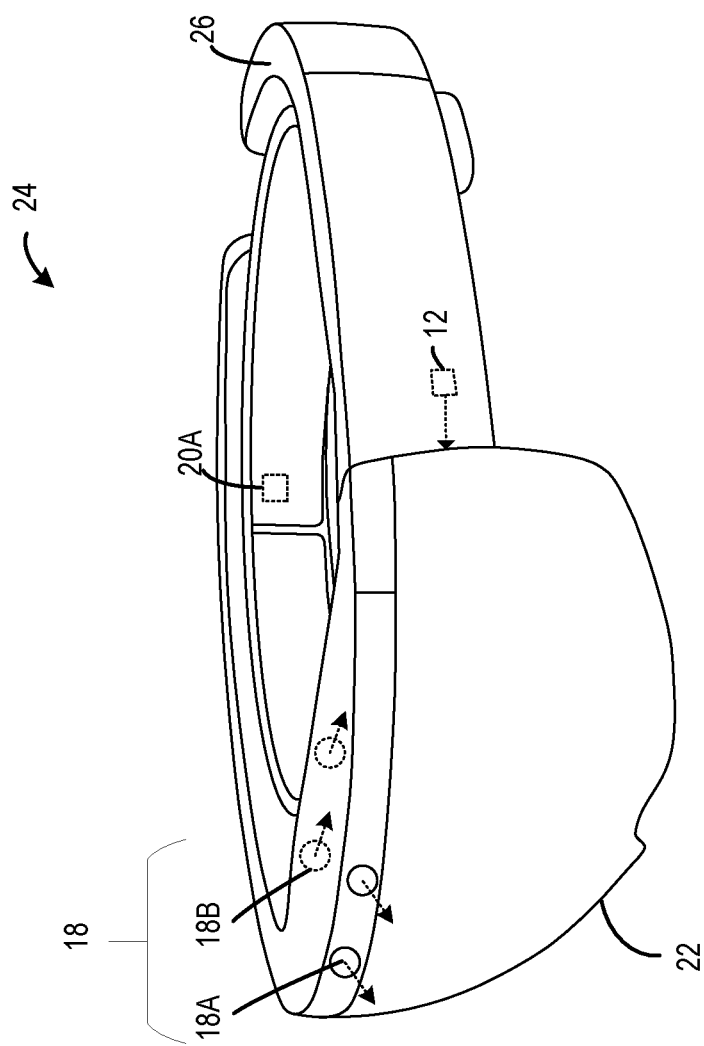
FIG. 2 shows a side perspective view of the computer system of FIG. 1 in the form of a head mounted display (HMD) device.

FIG. 2 illustrates an example computer system 10 in the form of an HMD device 24. The HMD device 24 may be worn by a user according to an example of the present disclosure. In other examples, an HMD device may take other suitable forms in which an at least partially see-through display is supported in front of a viewer's eye or eyes in an augmented reality HMD device configuration.

In the example of FIG. 1, the HMD device 24 includes a frame 26 that wraps around the head of the user to position the display device 22, which takes the form of a near-eye display in this example, close to the user's eyes. The frame supports additional components of the HMD device 24, such as, for example, the processor 12 and camera devices 18. The processor 12 includes logic and associated computer memory configured to provide image signals to the display device 22, to receive sensory signals from camera devices 18, input devices 20, and to enact various control processes described herein.

Any suitable display technology and configuration may be used to display images via the display device 22. For example, in a non-augmented reality configuration, the display device 22 may be a non-see-through Light-Emitting Diode (LED) display, a Liquid Crystal Display (LCD), or any other suitable type of non-see-through display. In an augmented reality configuration, the display device 22 may be configured to enable a wearer of the HMD device 24 to view a physical, real-world object in the physical environment through one or more partially transparent pixels displaying virtual object representations. For example, the display device 22 may include image-producing elements such as, for example, a see-through Organic Light-Emitting Diode (OLED) display.

As another example, the HMD device 24 may include a light modulator on an edge of the display device 14. In this example, the display device 22 may serve as a light guide for delivering light from the light modulator to the eyes of a wearer. In other examples, the display device 22 may utilize a liquid crystal on silicon (LCOS) display.

The input devices 20 may include various sensors and related systems to provide information to the processor 12. Such sensors may include an inertial measurement unit (IMU) 20A. The camera device 18 may include one or more outward facing camera devices 18A, and one or more inward facing camera devices 18B. The one or more inward facing camera devices 18B may be configured to acquire image data in the form of gaze tracking data from a wearer's eyes.

The one or more outward facing camera devices 18A may be configured to capture and/or measure physical environment attributes of the physical environment in which the HMD device 24 is located. In one example, the one or more outward facing camera devices 18A may include a visible-light camera or RBG camera configured to collect a visible-light image of a physical space. Further, the one or more outward facing camera devices 18A may include a depth camera configured to collect a depth image of a physical space. More particularly, in one example the depth camera is an infrared time-of-flight depth camera. In another example, the depth camera is an infrared structured light depth camera.

Data from the outward facing camera devices 18A may be used by the processor 12 to generate and/or update a three-dimensional (3D) model of the physical environment. Data from the outward facing camera devices 18B may be used by the processor 12 to identify surfaces of the physical environment and/or measure one or more surface parameters of the physical environment. The processor 16 may execute instructions to generate/update virtual scenes displayed on display device 14, identify surfaces of the physical environment, and recognize objects in the physical environment, as will be described in more detail below.

In augmented reality configurations of HMD device 24, the position and/or orientation of the HMD device 24 relative to the physical environment may be assessed so that augmented-reality images may be accurately displayed in desired real-world locations with desired orientations. As noted above, the processor 12 may execute instructions to generate a 3D model of the physical environment including surface reconstruction information, which may include generating a geometric representation of the physical environment that may be used to identify surfaces and boundaries between objects, and recognize those objects in the physical environment.

In both augmented reality and non-augmented reality configurations of HMD device 24, the IMU 20A of HMD device 10 may be configured to provide position and/or orientation data of the HMD device 24 to the processor 12. In one implementation, the IMU 20A may be configured as a three-axis or three-degree of freedom (3 DOF) position sensor system. This example position sensor system may, for example, include three gyroscopes to indicate or measure a change in orientation of the HMD device 24 within 3D space about three orthogonal axes (e.g., roll, pitch, and yaw). The orientation derived from the sensor signals of the IMU may be used to display, via the display device 12, one or more holographic images with a realistic and stable position and orientation.

In another example, the IMU 20A may be configured as a six-axis or six-degree of freedom (6 DOF) position sensor system. Such a configuration may include three accelerometers and three gyroscopes to indicate or measure a change in location of the HMD device 24 along three orthogonal spatial axes (e.g., x, y, and z) and a change in device orientation about three orthogonal rotation axes (e.g., yaw, pitch, and roll). In some implementations, position and orientation data from the outward facing camera devices 18A and the IMU 20A may be used in conjunction to determine a position and orientation (or 6 DOF pose) of the HMD device 24.

In some examples, a 6 DOF position sensor system may be used to display holographic representations in a world-locked manner. A world-locked holographic representation appears to be fixed relative to one or more real world objects viewable through the HMD device 24, thereby enabling a wearer of the HMD device 24 to move around a real world physical environment while perceiving a world-locked hologram as remaining stationary in a fixed location and orientation relative to the one or more real world objects in the physical environment.

Figure 3:
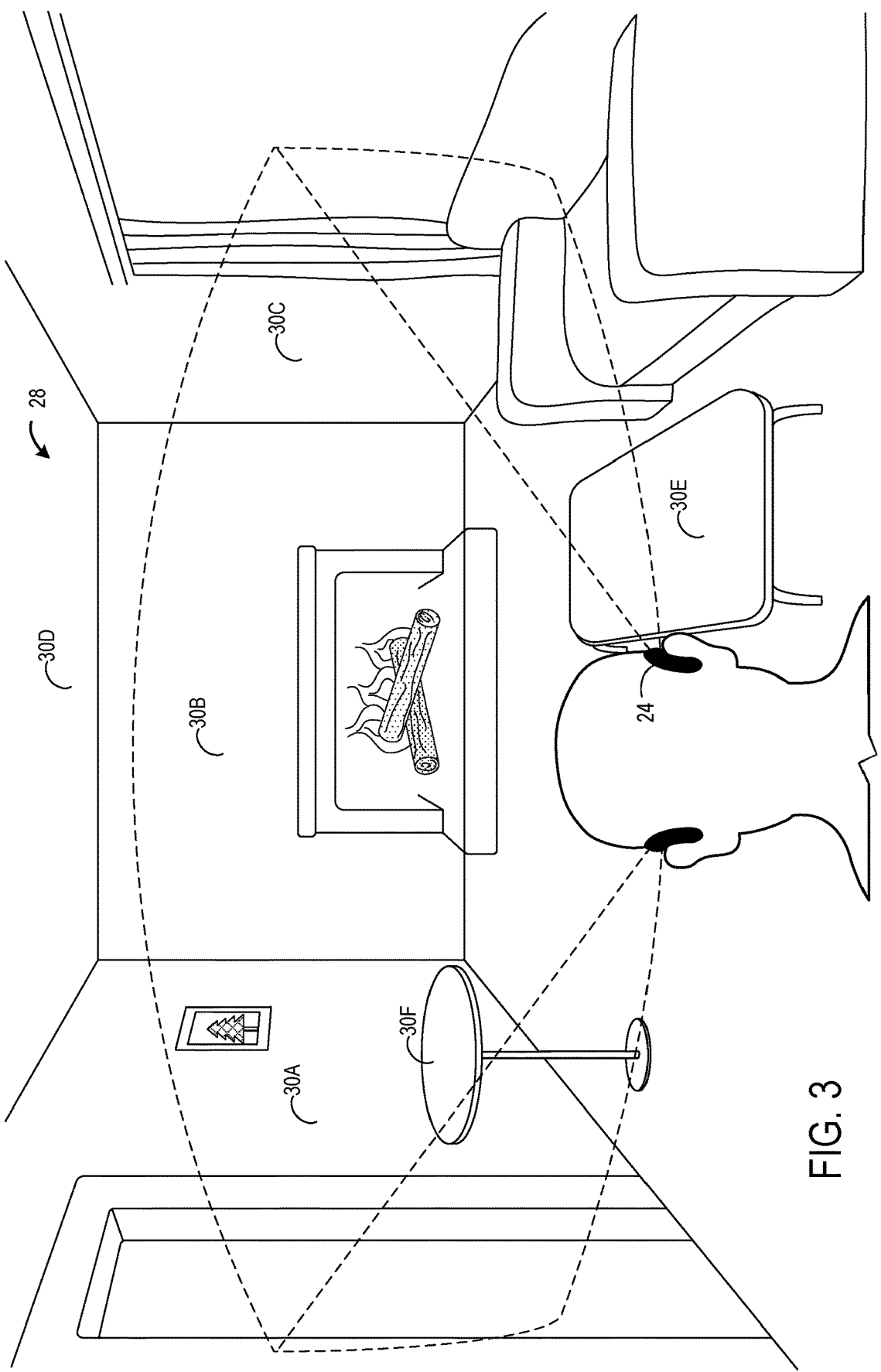
FIG. 3 shows an example physical environment captured by the computer system of FIG. 1.

FIG. 3 illustrates an example physical environment 28 in the form of a room in a house of the user. Camera devices 18 of the computer system 10, which takes the form of the HMD device 24 in this example, are configured to capture RBG data and depth data of the physical environment 28. The illustrated example of the physical environment 28 includes a plurality of different physical objects 30, such as, for example, a first wall 30A, a second wall 30B, a third wall 30C, a ceiling 30D, a first table 30E, a second table 30F, etc. These physical objects 30 are imaged along with the physical environment 30 by the camera devices 18, and sent to the processor of the HMD device 24 for surface reconstruction and scene decomposition, as described in more detail below.

Turning back to FIG. 1, RBG data 32 and depth data 34 captured by the camera device 18 are sent to the processor 12 as scene data 36. The scene data 36 may be processed by an operating system 38 executed by the processor 12 of the computer system 10. As illustrated in FIG. 1, the processor 12 may be further configured to execute one or more application programs 40 configured to communicate with the operating system 38. In another example, the functions and processes of the operating system 38 described herein may be performed by one of the application programs 40 executed on the computer system 10.

The scene data 36 is processed by a surface reconstruction and decomposition pipeline 42 of the operating system 38, which will be described in more detail below. The surface reconstruction and decomposition pipeline 42 is configured to process the scene data 36 to identify objects within the physical environment. For each identified object, the surface reconstruction and decomposition pipeline 42 may be configured to instantiate a virtual object 54 and modify object parameters 56 of that virtual object to match the characteristics of the identified object. As a specific example, a virtual table object may be instantiated for the physical table object 30E in the example physical environment 28 illustrated in FIG. 3. Various object parameters, such as a table top dimensions, number of table legs, table leg dimensions, table material, position, orientation, etc., may then be modified such that the virtual table object matches the characteristics of the physical table object 30E.

Each virtual object 54 may be stored and handled by an object handler 58 of the operating system 38. Each of the plurality of virtual object 54 may be assigned a unique identifier 60 and stored in memory of the computer system 10. The plurality of virtual objects 54 persist through each successive update to the surface reconstruction and decomposition for the physical environment 28. Each time the computer system 10 captures new scene data 36 of the physical environment 28 and performs surface reconstruction and decomposition processes on the updated scene data 36, the operating system 38 may be configured to search for correspondences between physical objects and virtual objects from successive updates and perform lightweight tracking and association. The physical objects and associated virtual objects may be tracked across successive updates to the scene data 36 based on the relative positions of objects in the scene data 36 between successive updates.

For example, if a table object was identified at a particular position in a previous update to the scene data 36 and associated with a virtual table object, and a candidate object is recognized at proximate position in a new update to the scene data 36, the operating system 38 may be configured to compare geometric characteristics of the virtual table object to the geometric characteristics of the candidate object to determine whether there is a match. Additionally, specific object class-based heuristics may be applied to improve robustness of this association. For example, structural objects such as, for example, walls, floors, ceilings, etc., may be assumed to be static and will have tighter tolerances for motion than objects of other classes such as chairs, people, and other types of objects that are likely to move. Known relationships between detectable surfaces of objects may also be used for tracking and associated between successive updates. For example, a chair object has a known association between a back plane and a seat of the chair (e.g. connected vertical and horizontal planes), which may be used to predict how a rotation or changing orientation of the chair physical object will affect the relative positions of the surfaces of the chair in the scene data 36. Thus, if a chair physical object is rotated between successive updates thus changing the geometric representation of that chair, the same virtual chair object may nonetheless be tracked and associated with that chair physical object, and appropriate transformations may be applied to the virtual chair object to match the change to the physical chair object.

In this manner, each virtual object 54 may be persisted through each successive update, and the scene data 36 may be decomposed into the same set of virtual objects 54 across each successive update. Further, the plurality of virtual objects 54 may be updated based on the updates to the scene data 36. For example, if the update to the scene data 36 includes a new perspective or view of a particular physical object that reveals new or more accurate geometric characteristics of that particular physical object, the operating system 38 may be configured to update the one or more object parameters 56 of the associated virtual object 54 to match the new or more accurate geometric characteristics. As another example, a physical object may be moved between successive updates in the scene data 36. Thus, the operating system 38 may be configured to update a position object parameter of the associated virtual object. As yet another example, a physical object may be removed from the physical environment or a new physical object may be added to the physical environment between successive updates. Thus, the operating system 38 may be configured to respectively add or remove associated virtual objects from the plurality of virtual objects 54 associated with that physical environment.

The plurality of virtual objects 54 may be made available to the application programs 40 executed by the processor 12. For example, the object handler 58 may provide an application programming interface (API) that may be called by the application programs 40. Upon receiving a request from an application, the object handler 58 may enumerate the virtual objects 54 to the requesting application program 40 and provide access to the data of the virtual objects 54. In this manner, the application programs 40 may be developed to handle the virtual object types and their object parameters 56 that have defined relationships and characteristics recognized by the operating system 38.

As discussed above, object parameters 56 of the virtual objects may potentially be modified by the operating system 38 due to an update to the scene data 36. That is, a physical object may have been moved, turned, removed, added, etc., to the physical environment, and corresponding changes are made to the associated virtual objects 54. Upon determining a change to one or more object parameters 56 of a virtual object 54, the object handler 58 may be configured to push an event notification 62 to the application programs 40. In one example, an application program 40 may be configured to only handle specific types of objects rather than the entire geometric representation 44 of the physical environment 28. In this example, the application program 40 may be configured to register a list of specific virtual objects of the plurality of virtual objects 54 with the object handler that are important to the application program 40. The object handler 58 may then be configured to track any changes to the registered virtual objects, and push event notifications 62 for those changes to the registered virtual objects rather than updating the entire geometric representation 44 of the physical environment 28.

Figure 4:
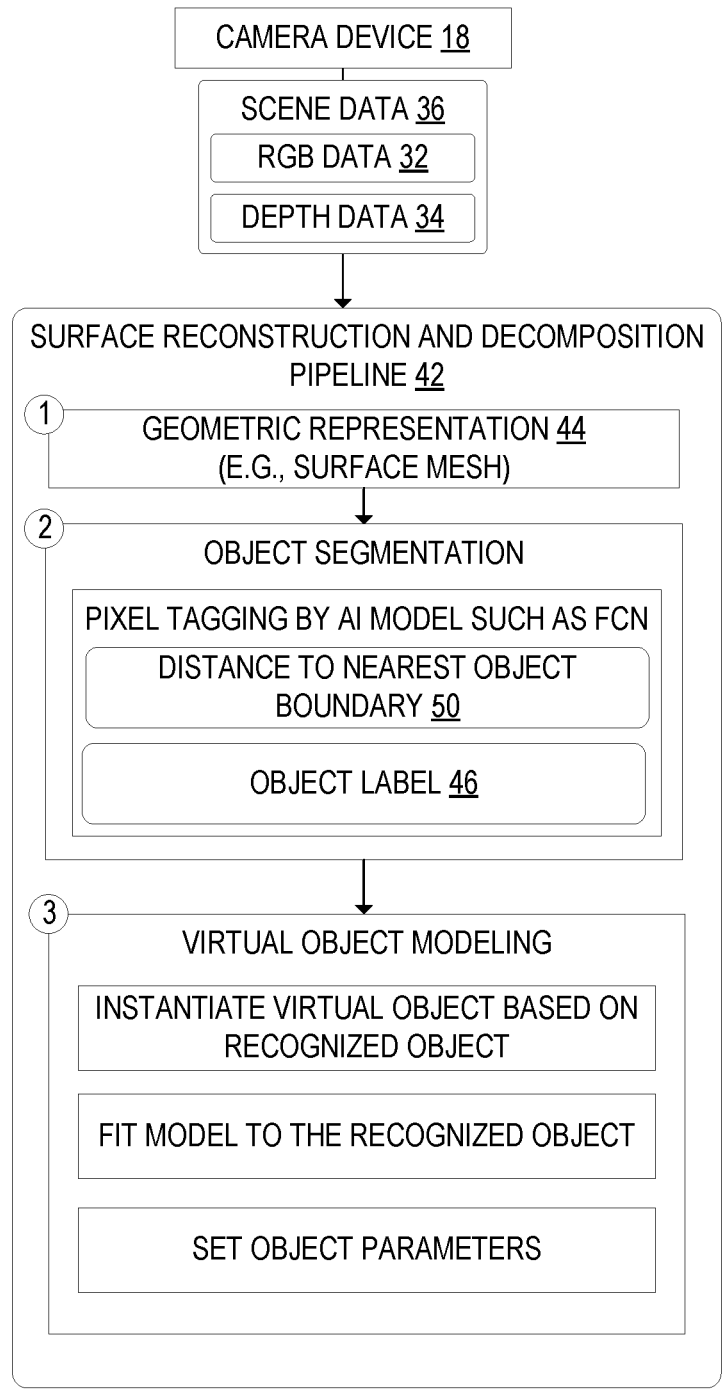
FIG. 4 shows an example surface reconstruction and decomposition pipeline executed by the computer system of FIG. 1.

FIG. 4 illustrates an example surface reconstruction and decomposition pipeline 42 of the operating system 38. At step (1) of the pipeline, a geometric representation 44 is generated for the scene data 36 received from the camera deice 18, such as, for example, a mesh having vertices and indices that represents the physical environment. The geometric representation 44 of the scene data 36 may be generated via any suitable surface reconstruction method.

At step (2), the surface reconstruction and decomposition pipeline 42 is further configured to process the scene data 36 using a Deep Neural Network (DNN) to identify object labels 46 and instance boundaries within the scene data. As a specific example, the DNN may be a Fully Convolutional Network (FCN), which is a Convolutional Neural Network where the last fully connected layer is substituted by another convolutional layer with a large receptive field. Using per-pixel output from the FCN, the surface reconstruction and decomposition pipeline 42 is configured to generate a signed distance field (SDF) 48 that includes, for each pixel in the scene data 36, a distance 50 to a nearest instance boundary (e.g. likely edge of an object in the physical environment), and an object label 46 indicating a probability that the pixel lies on an object of a predetermined type. For example, the FCN may be trained to identify objects including, but limited to, an unrecognized object, a wall, a floor, a ceiling, a table, a chair, a window, a door, a monitor, a stair, and a world. It should be appreciated that the FCN may be trained to identify other types of objects, such as, for example, a couch, a tree, a ball, etc.

At step (3), the surface reconstruction and decomposition pipeline 42 is configured to fit object models managed by a model library 52 based on the geometric representation 44 and signed distance field 48 of the scene data 36. For example, the surface reconstruction and decomposition pipeline 42 may be configured to augment the volumetric data of the geometric representation 44 with the object labels 46 from the signed distance field 48. An identified cluster of voxels of the geometric representation 44 having the same object label 46 may then be extruded from the geometric representation 44, and a corresponding virtual object model selected from a plurality of virtual object models 64 stored by a model library 52 may be instantiated and fit to the volumetric characteristics of the extruded voxels.

The virtual object modeling at step (3) of the pipeline may be performed for each recognized object in the scene data 36 such that the scene data 36 is decomposed into a plurality of virtual objects 54 that persist through updates to the scene data 36.

Figure 5:
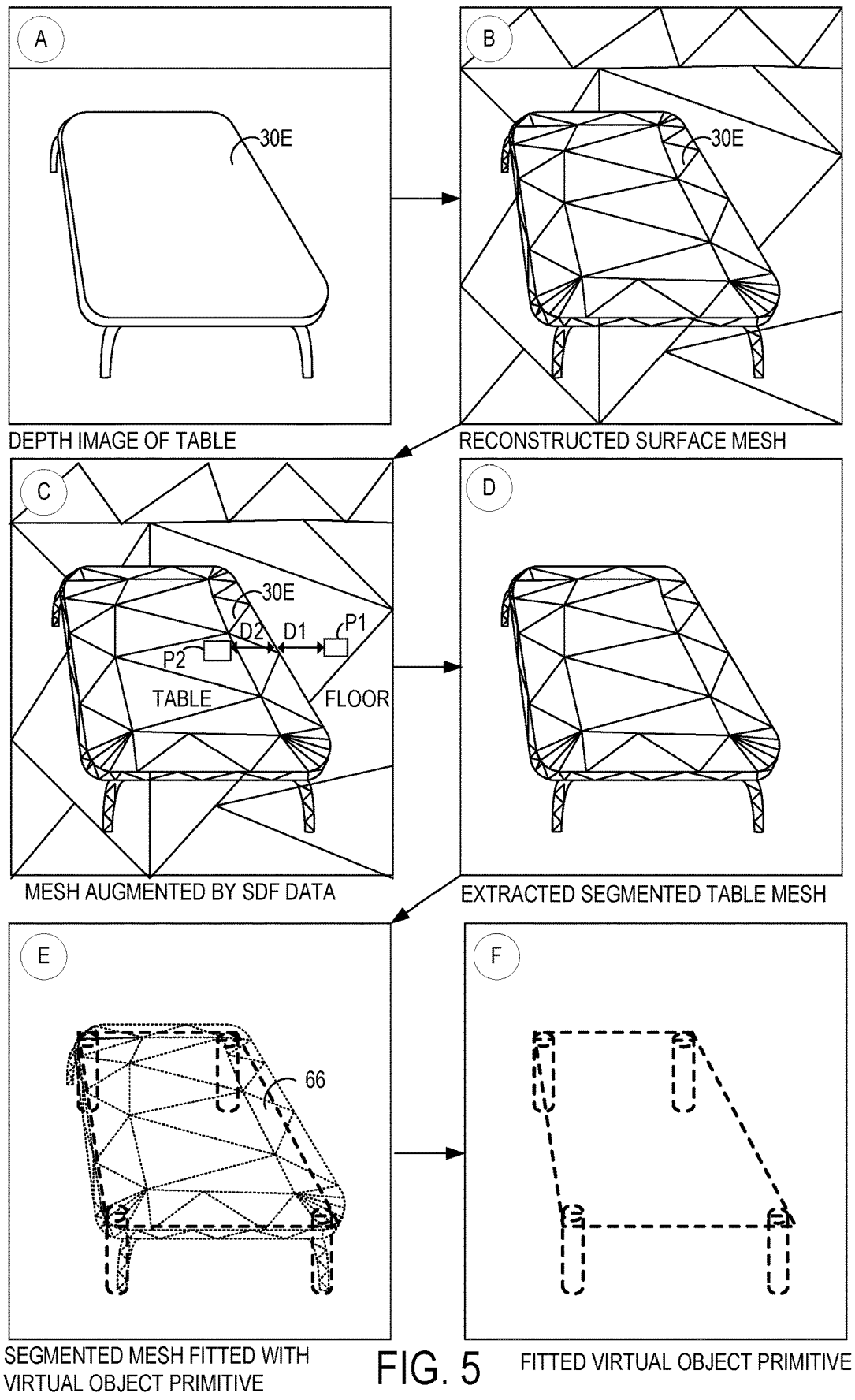
FIG. 5 at (A) shows an example depth image of a table physical object from the physical environment captured by the computer system of FIG. 1.

FIG. 5 illustrates an example of scene data being processed by the surface reconstruction and decomposition pipeline 42 described above. FIG. 5(A) shows a portion of an example depth image centered at the physical table object 30E of the physical environment of FIG. 3. The depth image is processed by surface reconstruction techniques at step (1) of the surface reconstruction and decomposition pipeline 42 to generate a geometric representation of the physical environment 28. FIG. 5(B) shows an example geometric representation in the form of a surface mesh.

At step (2) of the surface reconstruction and decomposition pipeline 42, the scene data including the depth image is processed by an artificial intelligence machine learning model such as an FCN to produce SDF data which indicates, for each pixel, a distance to a nearest instance boundary 50 and an object label of the type of object that pixels likely lies upon. In the example illustrated in FIG. 5(C), a first pixel P1 in the signed distance field may be tagged by the FCN with a distance D1 to the nearest boundary of the scene data near the table physical object 30E of the physical environment 28 in FIG. 3, and may be tagged with a floor object label. A second pixel P2, which lies on the table physical object 30E, may be tagged with a distance D2 to the same boundary of the scene data (e.g. edge of the table) having an opposite sign to the distance D1. Further, the pixel P2 may be tagged with a table object label 46. In this manner, each pixel in the signed distance field generated for the scene data 36 may be tagged with a distance to the nearest instance boundary 50 and an object label 46 that corresponding to a virtual object model 64 of the model library 52.

FIG. 5(C) further shows the surface mesh from FIG. 5(B) being augmented with the SDF data produced at step (2) of the surface reconstruction and decomposition pipeline 42. For example, the voxels of the surface mesh may be augmented by being tagged with the object label of the pixel that lies on that voxel from the SDF data. After augmentation, the collection of voxels from the surface mesh that have been tagged with a table object label may be extracted/extruded from the surface mesh of the physical environment, as shown at FIG. 5(D).

The surface reconstruction and decomposition pipeline 42 may then generate a virtual table object primitive 66 from the model library 52, which may include predetermined surfaces, geometries, characteristics, and predetermined methods of transforming the primitive to handle movement, rotation, etc. One or more object parameters of the virtual table object may be set/changed to fit the virtual table object 66 to the geometric characteristics of the extruded set of voxels tagged with a table object label. FIG. 5(E) illustrates an example of fitting a virtual table object 66 to the geometric characteristics of the extracted table mesh shown in FIG. 5(D).

The fitted virtual table object shown in FIG. 5(F) may then be stored by the operating system and persisted over time and successive updates to the scene data (e.g. new captured images of the physical environment). The fitted virtual object may then be passed to application programs executed by the computer system 10.

Figure 6:
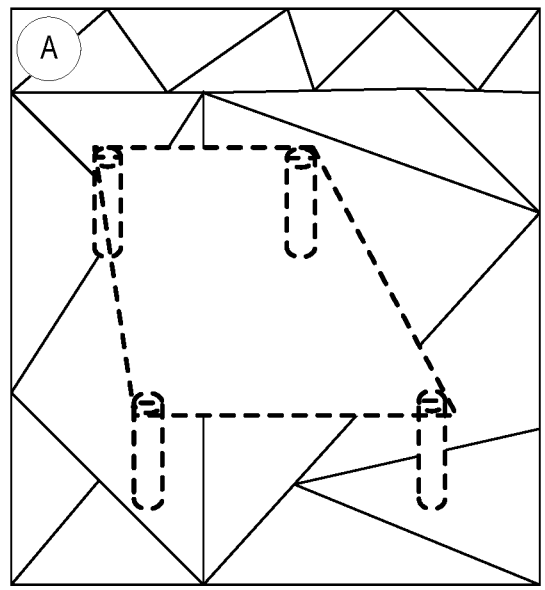
FIG. 6 at (A) shows the fitted virtual table object primitive overlaid on the surface mesh of the physical environment by the computer system of FIG. 1.
Figure 6:
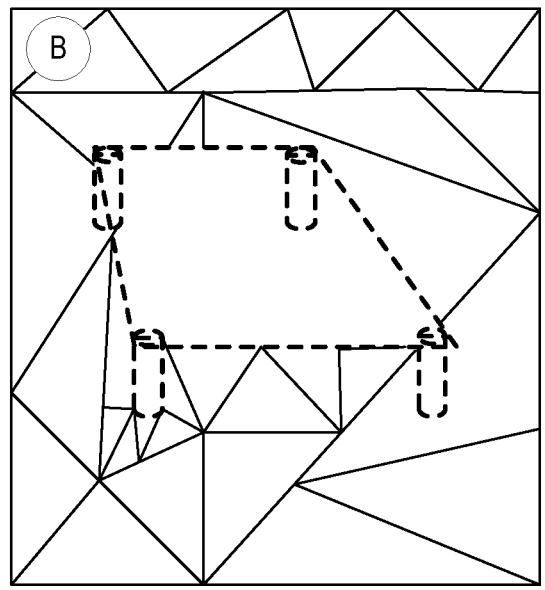

The fitted virtual object may then be tracked across successive updates to the scene data without requiring a full reconstruction/decomposition process. Further, changes in orientation and perspective of the user may be reflected in changes to the one or more parameters of the virtual object without requiring a full reconstruction/decomposition process of the scene data, thus saving processing resources and improving the processing speed for updating the 3D model of the physical environment. FIG. 6(A) shows an example of the fitted virtual object primitive from FIG. 5 being overlaid on a surface mesh of the physical environment generated for an update to the scene data captured for the physical environment. As shown, the fitted virtual object primitive is persisted and tracked across the update, rather than producing a new surface mesh of the associated physical table object for the update to the scene data.

In subsequent updates, the user may have moved to a different position or otherwise changed their perspective in the physical environment. Thus, updated scene data will have a different position and/or perspective in the physical environment. In one example, the change in position and/or perspective may be detected by an input device 20 of the computer system 10, such as, for example, the IMU 20A of the HMD device 24. In another example, the change in position and/or perspective may be detected via simultaneous localization and mapping (SLAM) techniques using images captured by the camera device 18. In these examples, the fitted virtual object primitive has predefined geometrical relationships (e.g. geometrical relationship between table legs and table top). Thus, any change in perspective of the fitted virtual object primitive may be applied to the fitted virtual object primitive via typical virtual object rendering techniques.

FIG. 6(B) illustrates an example of applying a transformation to the virtual table object primitive to account for the change in user perspective. As shown, a new surface mesh for the table object does not need to be recomputed, and a new virtual table object primitive does not need to be refitted. Rather, a direct transformation may be applied to the geometry of the virtual table object primitive, such that the same object persists across each update and transformation. It should be appreciated that directly applying this transformation is faster and requires less processing power than attempting to reconstruct a surface mesh for the table object from the updated scene data. Thus, rather than updating the entire surface mesh for the entire physical environment, only the portions of the physical environment that do not have an associated virtual object primitive are processed via surface reconstruction techniques.

Figure 7:
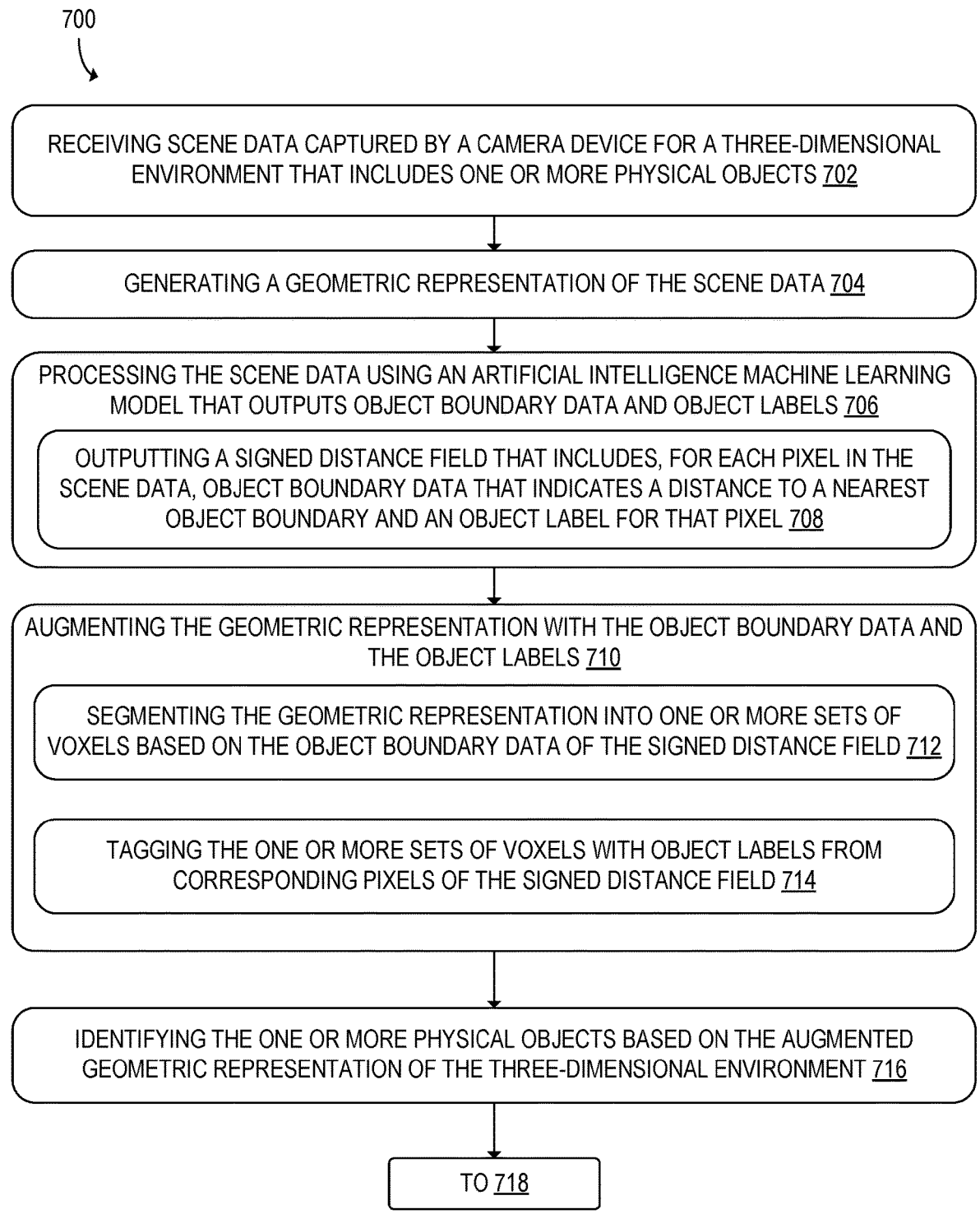
FIG. 7 shows a flowchart of an example method for decomposing scene data captured for a physical environment into virtual objects that persist over successive updates using the computer system of FIG. 1.

FIG. 7 shows a flowchart of a computer-implemented method 700. The method 700 may be implemented by the computer system 10 illustrated in FIG. 1. At step 702, the method 700 may include receiving scene data captured by a camera device for a three-dimensional environment that includes one or more physical objects. The camera device may include a red-green-blue (RGB) camera and a depth camera configured to take RGB and depth images of a physical environment in front of the camera device. In another example, the camera device may include one or more cameras located in different positions in the physical environment. The RGB and depth image data captured by the camera device may be sent to the processor of the computer system for processing by a surface reconstruction and decomposition pipeline that is illustrated in FIG. 4.

At 704, the method 700 may include generating a geometric representation of the scene data. In one example, the geometric representation may take the form of a geometric mesh. The geometric mesh may include vertices and indices that represents the physical environment captured in scene data at step 702. The geometric representation may be generated via any suitable surface reconstruction method.

At 706, the method 700 may include processing the scene data using an artificial intelligence machine learning model that outputs object boundary data and object labels. In one example, the artificial intelligence machine learning model includes a fully convolutional neural network, or another type of deep neural network. In one example, step 706 may further include step 708. At 708, the method 700 may include outputting a signed distance field that includes, for each pixel in the scene data, object boundary data that indicates a distance to a nearest object boundary and an object label for that pixel. Example signed distance field data is illustrated in FIG. 5 at (C).

At 710, the method 700 may include augmenting the geometric representation with the object boundary data and the object labels. Step 710 may include substeps 712 and 714. At 712, the method 700 may include segmenting the geometric representation into one or more sets of voxels based on the object boundary data of the signed distance field. In one example, the signed distance field data may be logically superimposed on top of the geometric representation of the scene data. The object boundary data, which indicates the distance to the nearest object boundary estimated by the artificial intelligence machine learning model, may be used to identify object boundaries in the geometric representation. The geometric representation may then be segmented into different potential objects along these identified boundaries.

At 714, the method 700 may include tagging the one or more sets of voxels with object labels from corresponding pixels of the signed distance field. Each voxel may be tagged with the object label of the pixels in the signed distance field that positionally correspond to that voxel in the scene data.

At 716, the method 700 may include identifying the one or more physical objects based on the augmented geometric representation of the three-dimensional environment. For example, each of the sets of voxels from step 712 may be identified based on the tagged object label. These object labels may include an unrecognized object, a wall, a floor, a ceiling, a table, a chair, a window, a door, a monitor, a stair, a world, a couch, a tree, a ball, etc.

Figure 8:
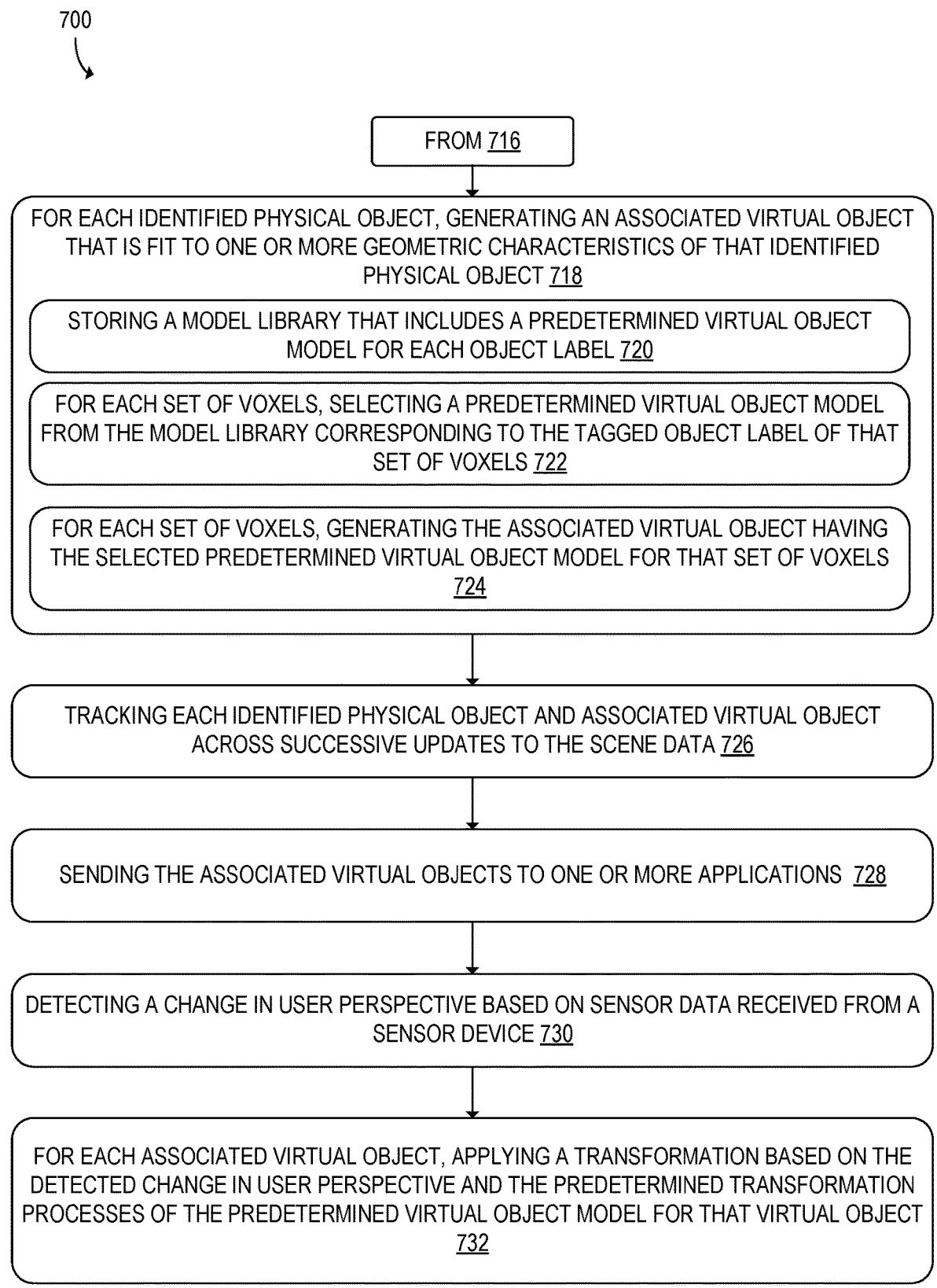
FIG. 8 shows a flowchart that continues the example method of FIG. 7.

The flowchart of the method 700 is continued in FIG. 8. At 718, the method 700 may include, for each identified physical object, generating an associated virtual object that is fit to one or more geometric characteristics of that identified physical object. Step 718 may include substeps 720, 722, and 724. At 720, the method 700 may include storing a model library that includes a predetermined virtual object model for each object label. For example, the predetermined virtual object models may include a table object model that includes various geometric characteristics and behaviors expected of a table. For example, such an object model may indicate that a table typically has one or more legs, a planar surface top that is perpendicular to the one or more legs. Each predetermined virtual object model may include predetermined object surfaces, predetermined geometries, and predetermined transformation processes for movement and rotation.

At 722, the method 700 may include, for each set of voxels, selecting a predetermined virtual object model from the model library corresponding to the tagged object label of that set of voxels. That is, for each type of object label that the artificial intelligence machine learning model has been trained to identify, the model library may include a corresponding predetermined virtual object model.

At 724, the method 700 may include, for each set of voxels, generating the associated virtual object having the selected predetermined virtual object model for that set of voxels. An instance of the associated virtual object may be instantiated and may include a unique identifier. The instantiated virtual object may be stored in memory of the computer system and referenced via a pointer. In this manner, the pointer to that instantiated virtual object may be passed to various applications executed on the computer system, such that those applications may access data for the instantiated virtual objects. The computer system may be configured to fit the instantiated virtual objects to the geometric characteristics of the associated set of voxels. For example, the computer system may modify position data, size data, and other types of geometric characteristics of the virtual object model in order to best fit the virtual object to the associated set of voxels.

At 726, the method 700 may include tracking each identified physical object and associated virtual object across successive updates to the scene data. That is, each of the instantiated virtual objects may be tracked and persisted across successive updates. The instantiated virtual objects may be identified in the updated scene data, and the various geometric characteristics, such as position and orientation relative to the user, may be modified based on the updated scene data.

At 728, the method 700 may include sending the associated virtual objects to one or more applications executed via the processor. For example, the computer system may send the unique identifier and/or pointer that references the virtual object to applications being executed on the computer system so that those application may perform some type of actions regarding the virtual objects.

At 730, the method 700 may include detecting a change in user perspective based on sensor data received from a sensor device. In one example, the computer system is an HMD device that includes various sensors to detect a position and orientation of the user.

At 732, the method 700 may include, for each associated virtual object, applying a transformation based on the detected change in user perspective and the predetermined transformation processes of the predetermined virtual object model for that virtual object. For example, if the user moves to a new user perspective relative to the instantiated virtual objects, the change in user perspective may be detected by the sensor devices of the computer system, and an updated view of the instantiated virtual objects may be calculated based on the predetermined transformation processes without requiring updated scene data to be captured by the camera devices.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
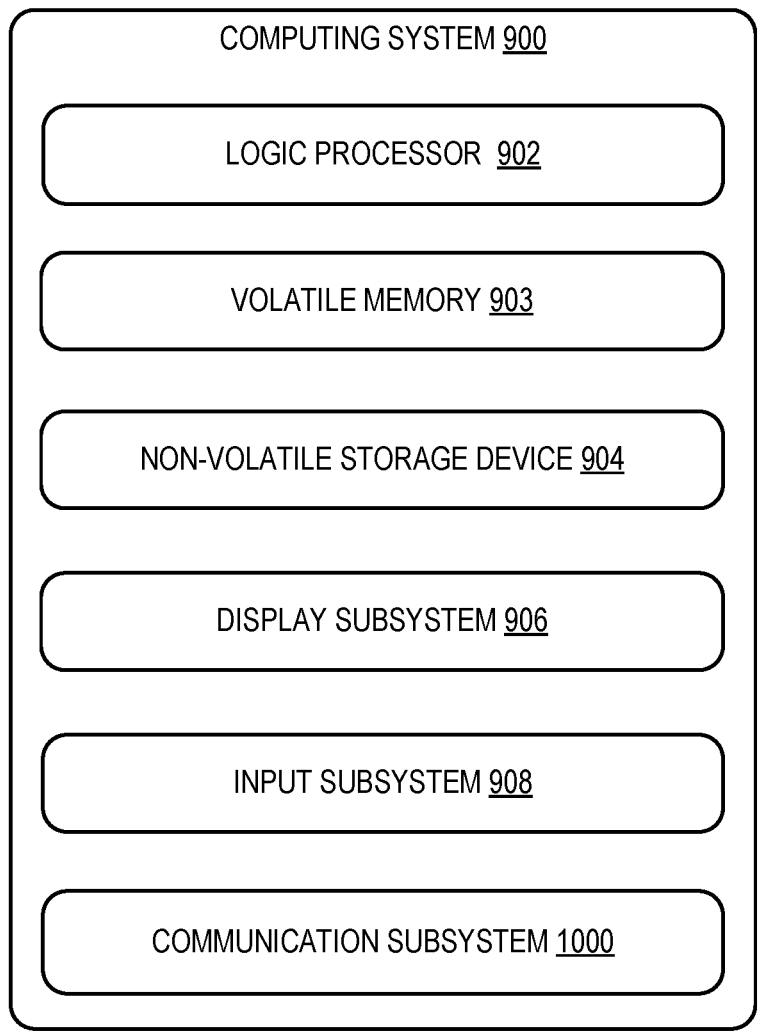
FIG. 9 shows an example computing system according to an embodiment of the present description.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 904 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, microphone, camera, or game controller.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional support for the claims of the subject application. One aspect provides a computer system comprising a camera device and a processor configured to receive scene data captured by the camera device for a three-dimensional environment that includes one or more physical objects, generate a geometric representation of the scene data, process the scene data using an artificial intelligence machine learning model that outputs object boundary data and object labels, augment the geometric representation with the object boundary data and the object labels, and identify the one or more physical objects based on the augmented geometric representation of the three-dimensional environment. For each identified physical object, the processor is further configured to generate an associated virtual object that is fit to one or more geometric characteristics of that identified physical object. The processor is further configured to track each identified physical object and associated virtual object across successive updates to the scene data. In this aspect, additionally or alternatively, the geometric representation may be a geometric mesh. In this aspect, additionally or alternatively, the artificial intelligence machine learning model may include a fully convolutional neural network. In this aspect, additionally or alternatively, the artificial intelligence machine learning model may be configured to output a signed distance field that includes, for each pixel in the scene data, object boundary data that indicates a distance to a nearest object boundary and an object label for that pixel. In this aspect, additionally or alternatively, to augment the geometric representation, the processor may be further configured to segment the geometric representation into one or more sets of voxels based on the object boundary data of the signed distance field, and tag the one or more sets of voxels with object labels from corresponding pixels of the signed distance field. In this aspect, additionally or alternatively, to generate each associated virtual object, the processor may be further configured to store a model library that includes a predetermined virtual object model for each object label. For each set of voxels, may processor may be configured to select a predetermined virtual object model from the model library corresponding to the tagged object label of that set of voxels. For each set of voxels, the processor may be configured to generate the associated virtual object having the selected predetermined virtual object model for that set of voxels. In this aspect, additionally or alternatively, each predetermined virtual object model may include predetermined object surfaces, predetermined geometries, and predetermined transformation processes for movement and rotation. In this aspect, additionally or alternatively, the processor may be further configured to detect a change in user perspective based on sensor data received from a sensor device of the computer system. For each associated virtual object, the processor may be configured to apply a transformation based on the detected change in user perspective and the predetermined transformation processes of the predetermined virtual object model for that virtual object. In this aspect, additionally or alternatively, the processor may be further configured to send the associated virtual objects to one or more applications executed via the processor. In this aspect, additionally or alternatively, the computer system may be implemented in a head mounted display device.

Another aspect provides a method comprising, at a processor, receiving scene data captured by a camera device for a three-dimensional environment that includes one or more physical objects, generating a geometric representation of the scene data, processing the scene data using an artificial intelligence machine learning model that outputs object boundary data and object labels, augmenting the geometric representation with the object boundary data and the object labels, and identifying the one or more physical objects based on the augmented geometric representation of the three-dimensional environment. For each identified physical object, the method further comprises generating an associated virtual object that is fit to one or more geometric characteristics of that identified physical object. The method further comprises tracking each identified physical object and associated virtual object across successive updates to the scene data. In this aspect, additionally or alternatively, the geometric representation may be a geometric mesh. In this aspect, additionally or alternatively, the artificial intelligence machine learning model may include a fully convolutional neural network. In this aspect, additionally or alternatively, the artificial intelligence machine learning model may output a signed distance field that includes, for each pixel in the scene data, object boundary data that indicates a distance to a nearest object boundary and an object label for that pixel. In this aspect, additionally or alternatively, augmenting the geometric representation may further comprise segmenting the geometric representation into one or more sets of voxels based on the object boundary data of the signed distance field, and tagging the one or more sets of voxels with object labels from corresponding pixels of the signed distance field. In this aspect, additionally or alternatively, generating each associated virtual object further comprise storing a model library that includes a predetermined virtual object model for each object label. For each set of voxels, the method may further comprises selecting a predetermined virtual object model from the model library corresponding to the tagged object label of that set of voxels. For each set of voxels, the method may further comprises generating the associated virtual object having the selected predetermined virtual object model for that set of voxels. In this aspect, additionally or alternatively, each predetermined virtual object model may include predetermined object surfaces, predetermined geometries, and predetermined transformation processes for movement and rotation. In this aspect, additionally or alternatively, the method may further comprises detecting a change in user perspective based on sensor data received from a sensor device. For each associated virtual object, the method may further comprise applying a transformation based on the detected change in user perspective and the predetermined transformation processes of the predetermined virtual object model for that virtual object. In this aspect, additionally or alternatively, the method may further comprises sending the associated virtual objects to one or more applications executed via the processor.

Another aspect provides a head mounted display device comprising a camera device, a near-eye display device, a sensor device configured to measure a position and orientation of the head mounted display device, and a processor. The processor is configured to receive scene data captured by the camera device for a three-dimensional environment that includes one or more physical objects, generate a geometric representation of the scene data, process the scene data using an artificial intelligence machine learning model that outputs object boundary data and object labels, augment the geometric representation with the object boundary data and the object labels, and identify the one or more physical objects based on the augmented geometric representation of the three-dimensional environment. For each identified physical object, the processor is configured to generate an associated virtual object that is fit to one or more geometric characteristics of that identified physical object. The processor is configured to detect a change in user perspective based on sensor data received from the sensor device. For each associated virtual object, the processor is configured to apply a transformation to that virtual object based on the detected change in user perspective.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
   a sensor device configured to measure a position and orientation of a user of the computer system;
   a camera device; and
   a processor configured to:
      receive scene data captured by the camera device for a three-dimensional environment that includes one or more physical objects;
      generate a surface mesh of the scene data;
      process the scene data using an artificial intelligence machine learning model that outputs object boundary data and object labels;
      augment the surface mesh with the object boundary data and the object labels;
      identify the one or more physical objects based on the augmented surface mesh of the three-dimensional environment;
      for each identified physical object, select a virtual object model primitive based on the identified physical object from a model library that includes a plurality of virtual object model primitives and generate an associated virtual object model based on the selected virtual object model primitive that is fit within an object boundary of that identified physical object indicated by the object boundary data to one or more geometric characteristics of that identified physical object;
      detect a change in user perspective based on sensor data received from the sensor device; and
      for each associated virtual object model, apply a transformation to that virtual object model based on the detected change in user perspective, without generating an updated surface mesh within the object boundary of an associated identified physical object in successive updates to the scene data.

2. The computer system of claim 1, wherein the surface mesh is a geometric mesh.

3. The computer system of claim 1, wherein the artificial intelligence machine learning model includes a fully convolutional neural network.

4. The computer system of claim 1, wherein the artificial intelligence machine learning model is configured to output a signed distance field that includes, for each pixel in the scene data, object boundary data that indicates a distance to a nearest object boundary and an object label for that pixel.

5. The computer system of claim 4, wherein to augment the surface mesh, the processor is further configured to:
   segment the surface mesh into one or more sets of voxels based on the object boundary data of the signed distance field; and
   tag the one or more sets of voxels with object labels from corresponding pixels of the signed distance field.

6. The computer system of claim 5, wherein the model library includes a predetermined virtual object model primitive for each object label, and wherein to generate each associated virtual object model, the processor is further configured to:
   for each set of voxels, select a predetermined virtual object model primitive from the model library corresponding to the tagged object label of that set of voxels; and
   for each set of voxels, generate the associated virtual object model based on the selected predetermined virtual object model primitive for that set of voxels.

7. The computer system of claim 6, wherein each predetermined virtual object model primitive includes predetermined object surfaces, predetermined geometries, and predetermined transformation processes for movement and rotation.

8. The computer system of claim 1, wherein the processor is further configured to send the associated virtual object models to one or more applications executed via the processor.

9. The computer system of claim 1 implemented in a head mounted display device.

10. The computer system of claim 1, wherein the processor is further configured to track each identified physical object and associated virtual object model across successive updates to the scene data.

11. A method comprising:
at a processor:
receiving scene data captured by a camera device for a three-dimensional environment that includes one or more physical objects;
generating a surface mesh of the scene data;
processing the scene data using an artificial intelligence machine learning model that outputs object boundary data and object labels;
augmenting the surface mesh with the object boundary data and the object labels;
identifying the one or more physical objects based on the augmented surface mesh of the three-dimensional environment;
for each identified physical object, selecting a virtual object model primitive based on the identified physical object from a model library that includes a plurality of virtual object model primitives and generating an associated virtual object model based on the selected virtual object model primitive that is fit within an object boundary of that identified physical object indicated by the object boundary data to one or more geometric characteristics of that identified physical object;
detecting a change in user perspective based on sensor data received from a sensor device configured to measure a position and orientation of a user; and
for each associated virtual object model, applying a transformation to that virtual object model based on the detected change in user perspective, without generating an updated surface mesh within the object boundary of an associated identified physical object in successive updates to the scene data.

12. The method of claim 11, wherein the surface mesh is a geometric mesh.

13. The method of claim 11, wherein the artificial intelligence machine learning model includes a fully convolutional neural network.

14. The method of claim 11, wherein the artificial intelligence machine learning model outputs a signed distance field that includes, for each pixel in the scene data, object boundary data that indicates a distance to a nearest object boundary and an object label for that pixel.

15. The method of claim 14, wherein augmenting the surface mesh further comprises:
segmenting the surface mesh into one or more sets of voxels based on the object boundary data of the signed distance field; and
tagging the one or more sets of voxels with object labels from corresponding pixels of the signed distance field.

16. The method of claim 15, wherein the model library includes a predetermined virtual object model primitive for each object label, and wherein generating each associated virtual object model further comprises:
for each set of voxels, selecting a predetermined virtual object model primitive from the model library corresponding to the tagged object label of that set of voxels; and
for each set of voxels, generating the associated virtual object model based on the selected predetermined virtual object model primitive for that set of voxels.

17. The method of claim 16, wherein each predetermined virtual object model primitive includes predetermined object surfaces, predetermined geometries, and predetermined transformation processes for movement and rotation.

18. The method of claim 11, further comprising sending the associated virtual object models to one or more applications executed via the processor.

19. The method of claim 11, further comprising tracking each identified physical object and associated virtual object model across successive updates to the scene data.

20. A head mounted display device comprising:
a camera device;
a near-eye display device;
a sensor device configured to measure a position and orientation of the head mounted display device; and
a processor configured to:
receive scene data captured by the camera device for a three-dimensional environment that includes one or more physical objects;
generate a surface mesh of the scene data;
process the scene data using an artificial intelligence machine learning model that outputs object boundary data and object labels;
augment the surface mesh with the object boundary data and the object labels;
identify the one or more physical objects based on the augmented surface mesh of the three-dimensional environment;
for each identified physical object, select a virtual object model primitive based on the identified physical object from a model library that includes a plurality of virtual object model primitives and generate an associated virtual object model based on the selected virtual object model primitive that is fit within an object boundary of that identified physical object indicated by the object boundary data to one or more geometric characteristics of that identified physical object;
detect a change in user perspective based on sensor data received from the sensor device; and
for each associated virtual object model, apply a transformation to that virtual object model based on the detected change in user perspective, without generating an updated surface mesh within the object boundary of an associated identified physical object in successive updates to the scene data.

* * * * *